(12) United States Patent
Bower et al.

(10) Patent No.: US 10,419,367 B2
(45) Date of Patent: Sep. 17, 2019

(54) QUEUE BUFFER DE-QUEUING

(71) Applicant: Hewlett-Packard Development Company, L.P., Houston, TX (US)

(72) Inventors: Kenneth S Bower, Fort Collins, CO (US); Gary B Gostin, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 295 days.

(21) Appl. No.: 14/760,620

(22) PCT Filed: Jan. 25, 2013

(86) PCT No.: PCT/US2013/023083
§ 371 (c)(1),
(2) Date: Jul. 13, 2015

(87) PCT Pub. No.: WO2014/116223
PCT Pub. Date: Jul. 31, 2014

(65) Prior Publication Data
US 2015/0326508 A1      Nov. 12, 2015

(51) Int. Cl.
*H04L 12/861* (2013.01)
*H04L 12/863* (2013.01)
*H04L 12/851* (2013.01)
*G06F 13/38* (2006.01)

(52) U.S. Cl.
CPC ........ *H04L 49/9005* (2013.01); *G06F 13/382* (2013.01); *H04L 47/2441* (2013.01); *H04L 47/50* (2013.01); *H04L 49/90* (2013.01)

(58) Field of Classification Search
CPC . H04L 12/5601; H04L 12/5693; H04L 47/10; H04L 47/568; H04L 49/10; H04L 49/9005; H04L 49/9094; H04L 47/50; H04L 47/2441; H04L 49/90
USPC .... 370/230.1, 235, 236, 392, 413, 412, 429; 709/224
See application file for complete search history.

(56) References Cited

U.S. PATENT DOCUMENTS

| | | | |
|---|---|---|---|
| 5,689,644 A | 11/1997 | Chou | |
| 6,314,487 B1 | 11/2001 | Hahn | |
| 6,510,138 B1 * | 1/2003 | Pannell | H04L 47/10 370/236 |
| 6,563,831 B1 | 5/2003 | Dally et al. | |
| 6,654,343 B1 | 11/2003 | Brandis | |
| 6,674,720 B1 | 1/2004 | Passint et al. | |
| 7,187,679 B2 | 3/2007 | Dally et al. | |
| 7,519,054 B2 | 4/2009 | Varma et al. | |
| 7,583,596 B1 * | 9/2009 | Frink | H04L 12/5601 370/230.1 |
| 8,085,801 B2 | 2/2011 | Brueggen | |
| 8,018,958 B1 | 9/2011 | Johnson | |

(Continued)

OTHER PUBLICATIONS

Feng Ping, Implementing Synchronous Multicasting in Switch-Based Cluster Systems, DCABES 2004 Proceedings.
(Continued)

*Primary Examiner* — Harun Chowdhury
(74) *Attorney, Agent, or Firm* — Hewlett Packard Enterprise Patent Department (57) ABSTRACT

A method and apparatus determine which of a plurality of queue buffers (26, 126, 426) contains a complete packet and transmit a de-queue signal to one of the plurality of queue buffers (26, 126, 426) determined to contain a complete packet.

16 Claims, 4 Drawing Sheets

(56) References Cited

U.S. PATENT DOCUMENTS

| | | | | |
|---|---|---|---|---|
| 2003/0063618 A1* | 4/2003 | Khacherian | ............ | H04L 49/10 370/413 |
| 2009/0077567 A1* | 3/2009 | Craddock | ........... | G06F 13/4022 719/314 |
| 2009/0292575 A1* | 11/2009 | Ellebracht | ............... | H04L 47/10 709/224 |
| 2015/0188850 A1* | 7/2015 | Chan | .................. | H04L 49/9094 709/238 |

OTHER PUBLICATIONS

PCT/ISA/KR, International Search Report dated Oct. 21, 2013, 11 pps, PCT/US2013/023083.

\* cited by examiner

QUEUE BUFFER DE-QUEUING

BACKGROUND

Fabric switches transmit packets between input and output ports. When multiple packets are addressed to the same port, such packets may be queued. During such queuing, transmission delays may occur, reducing performance of the fabric switch.

DETAILED DESCRIPTION OF EXAMPLE IMPLEMENTATIONS

Figure 1:
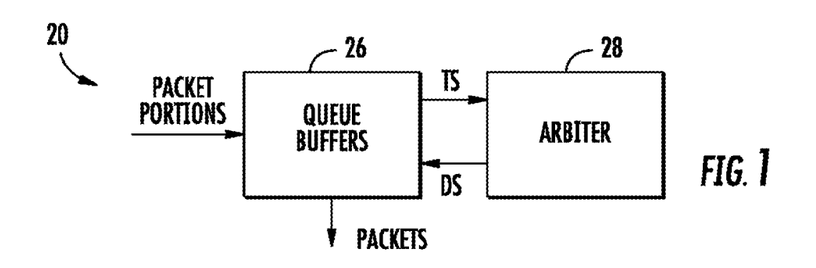
FIG. 1 is a schematic diagram of an example queue buffer arbitration system.

FIG. 1 schematically illustrates an example queue buffer arbitration system 20. As will be described hereafter, queue buffer arbitration system 20 arbitrates the de-queuing of queue buffers in a network switch by favoring queues having a complete packet. As a result, de-queuing delays caused by waiting for packets to be completed in a queue are reduced.

In the example illustrated, queue buffer arbitration system 20 comprises a circuit utilized as part of a switching fabric or fabric switch in the form of an output queued networking switch. An output queued networking switch is a switch in which data is held or queued for each output. Queue buffer arbitration system 20 comprises queue buffers 26 and arbiter 28. Queue buffers 26 comprise data or memory storage devices to temporarily store data in the form of flits (or other packet portions) which, together, form a larger complete packet. In one implementation, queue buffers 26 comprise SRAM memory forming at least one first in first out (FIFO). In other implementations, queue buffers 26 may comprise other memory storage devices.

Queue buffers 26 are provided as part of a network switch having inputs and outputs, wherein each output has a queue buffer 26 for each input. Each output's queue buffers 26 hold or queue data, in the form of packets or smaller portions of a packet (such as flits), addressed to the same output (or output port) from multiple inputs.

Arbiter 28 arbitrates an order at which the data held in the queue buffers 26 is released or transmitted through an output port to the output. Once arbiter 28 initiates de-queuing, the transmission or transfer of held data from a queue buffer to the associated output, such de-queuing continues until an entire packet of data has been transferred to the output. If de-queuing is initiated before an entire packet has been completely received at the queue buffer 26, arbiter 28 may have to wait for the queue buffer 26 to receive the missing final flits of the packet being transmitted. This may result in arbiter 28 inserting dead cycles on the output, increasing latency and reducing performance of the switch.

Arbiter 28 arbitrates the order at which data held in queue buffers 26 is released to the associated output in a manner so as to reduce a likelihood that de-queuing of a queue buffer will be initiated before an entire packet has been completely received at the queue buffer 26. As schematically shown in FIG. 1, queue buffers 26 receive packet portions and output tail signals (TS) to arbiter 28. Tail signals TS are outputted from the individual queue buffers 26 in response to the individual queue buffers 26 receiving a final packet portion of a packet, indicating a complete packet in the individual queue buffer 26. Based upon such received tail signals, arbiter 28 outputs a de-queue signal (DS) to one of the queue buffers 26 from which a signal TS has been received. By favoring those queue buffers 26 that contain a complete packet when determining for which queue buffer 26 de-queuing should be initiated, arbiter 28 is less likely to have to subsequently wait for the queue buffer 26 to receive the missing final packet portions of the packet being transmitted.

Figure 2:
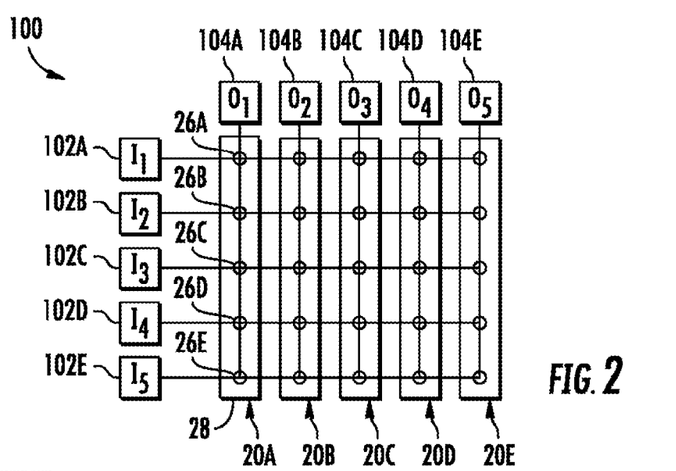
FIG. 2 is a schematic diagram of an example network including the queue buffer arbitration system of FIG. 1.

FIG. 2 schematically illustrates queue buffer arbitration systems 20A, 20B, 20C, 20D and 20E (collectively referred to as queue buffer arbitration systems 20) as part of an example network 100. In addition to queue buffer arbitration systems 20, network 100 comprises inputs 102A, 102B, 102C, 102D and 102E (collectively referred to as inputs 102) and outputs 104A, 104B, 104C, 104D and 104E (collectively referred to as outputs 104. Inputs 102 transmit data to outputs 104. Network 100 facilitates the sharing of resources amongst multiple devices utilizing inputs 102, the fabric switch formed by queue buffer systems 20, and outputs 104. Examples of resources or data that may be shared include, but are not limited to, memory, processors, input/output, communication buses (PCI, PCIe, PCI-X and AGP buses) and the like. In one implementation, some of inputs 102 and some of outputs 104 may occur on a single device in network 100. In some implementations, an input 102 and an output 104 may be an input and an output of another network.

Although network 100 is schematically illustrated as including a single "layer" of queue buffer systems 20 between inputs 102 and outputs 104, in other implementations, network 100 may comprise multiple "layers" of independent transmission channels (virtual channels) between inputs 102 and outputs 104 in protocol layers. For example, network 100 may include an additional "layer" of additional queue buffer systems 20 to provide two layers of virtual channels. In such an implementation, each queue buffer 26 comprises a first in first out (FIFO) for each virtual channel, wherein arbiter 28 further arbitrates the de-queuing of the FIFOs of each queue buffer 26 on each virtual channel to reduce or avoid conflicts. In one implementation, one virtual channel may be for responses while the other virtual channel is for requests.

As shown by FIG. 2, each of outputs 104 has a designated one of queue buffer arbitration systems 20 for buffering and arbitrating data from multiple inputs concurrently addressed to the output 104. Each of queue buffer arbitration systems 20 comprises a queue buffer for each of inputs, queue buffers 26A, 26B, 26C, 26D and 26E and an arbiter 28. For example, output 104A utilizes queue buffer arbitration system 20A for buffering and arbitrating data addressed to output 104A that is being concurrently sent from one or more of inputs 102A-102E.

In operation, by way of example with respect to output 104A and queue buffer arbitration system 20A, data sent concurrently from inputs 102 to output 104A is buffered or queued by buffers 26A-26E, depending upon from which inputs 102 such data is being sent. Arbiter 28 outputs a de-queue signal to one of the queue buffers 26 from which a tail signal has been received indicating that a complete packet is in the particular queue buffer 26. Once the particular queue buffer 26 receives the de-queue signal, the queuing is initiated, wherein the de-queuing continues until the entire packet has been transferred through the port to output 104A. Once the complete packet has been transferred, arbiter 28 once again determines whether any of the queue buffers 26 of system 20A have transmitted a tail signal indicating the presence of another complete packet. Arbiter 28 of system 20A once again outputs a de-queue signal to one of the queue buffers 26 from which a tail signal has been received indicating that a complete packet is in the particular queue buffer 26. This process repeats itself. In instances where more than one of queue buffers 26 of system 20A contain a complete packet, arbiter 28 may utilize a prioritization scheme to select which queue buffer 26 is to receive the de-queue signal. Examples of prioritization schemes that may be utilized by arbiter 28 when selecting a queue buffer 26 include, but are not limited to, first in time, round robin, fixed priority and random.

Although network 100 is illustrated as including five inputs 102, five outputs 104 and an output corresponding five queue buffer arbitration systems 20, in other implementations, network 100 may include a greater or fewer of such inputs 102, outputs 104 and queue buffer arbitration systems 20. As noted above, in some implementations, network 100 may include multiple protocol layers of virtual channels.

Figure 3:
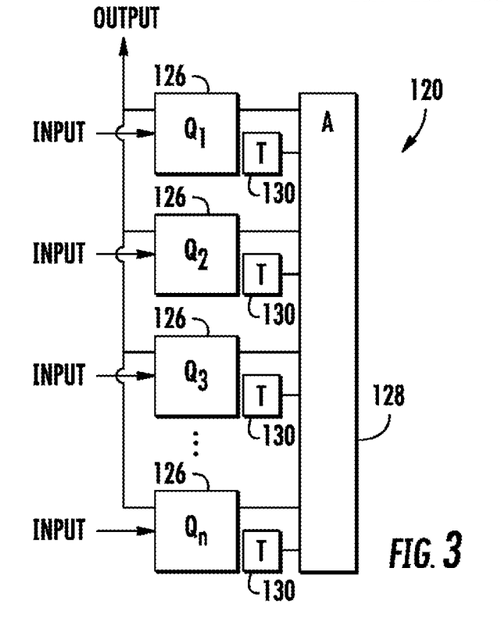
FIG. 3 is a schematic diagram of an example implementation of the queue buffer arbitration system of FIG. 1.

FIG. 3 schematically illustrates queue buffer arbitration system 120, an example implementation of queue buffer arbitration system 20. Queue buffer arbitration system 120 comprises queue buffers 126 and arbiter 128. As with queue buffers 26, queue buffers 126 comprise data or memory storage devices to temporarily store data in the form of flits (or other packet portions) which, together, form a larger complete packet. In one implementation, queue buffers 126 comprise SRAM memory forming at least one first in first out (FIFO). In other implementations, queue buffers 26 may comprise other memory storage devices.

As shown by FIG. 3, each queue buffer 126 comprises an associated tail counter 130. Each tail counter 130 keeps track of or counts a number of final packet completing packet portions (such as tail flits) that have been received by the particular queue buffer 126. Each tail counter 130 outputs a tail signal to arbiter 128. In one implementation, the tail signal may indicate a number of complete packets in the corresponding queue. In another implementation, the tail signal maybe binary in nature, indicating the presence or absence of a complete packet in the corresponding queue. In one implementation, tail counters 130 automatically assert or output the tail signal to arbiter 128 in a push fashion. In another implementation, tail counters 130 may be polled by arbiter 128 in a pull fashion.

Arbiter 128 is similar arbiter 28 described above. Arbiter 28 arbitrates the order at which data held in queue buffers 126 is released to the associated output in a manner so as to reduce a likelihood that de-queuing of a queue buffer will be initiated before an entire packet has been completely received at the queue buffer 26. Based upon tail signals received from tail counters 130, arbiter 128 outputs a de-queue signal (DS) to one of the queue buffers 126 from which a tail signal has been received. By favoring those queue buffers 126 that contain a complete packet when determining for which queue buffer 126 de-queuing should be initiated, arbiter 128 is less likely to have to subsequently wait for the queue buffer 126 to receive the missing final packet portions of the packet being transmitted.

Figure 4:
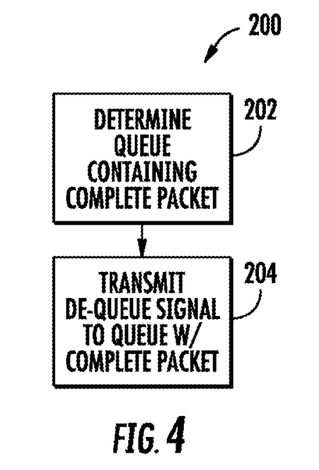
FIG. 4 is a flow diagram of an example method that may be carried out by the queue buffer arbitration systems of FIG. 1 or 3.

FIG. 4 is a flow diagram illustrating an example method 200 that may be carried out by either of the queue buffer arbitration systems 20, 120 described above. As indicated by step 202, arbiter 28, 128 determines or identifies those queue buffers 26, 126 that contain a complete packet waiting to be transferred to the associated output of the network switch. In one implementation, the arbiter 28, 128 makes this determination by identifying from which of buffer queues 26, 126 arbiter 28, 128 has received a tail signal since the output of the last de-queue signal by arbiter 28, 128.

As indicated by step 204, upon identifying a buffer queue 26, 126 as containing a complete packet, arbiter 28, 128 transmits a de-queue signal to the particular queue 26, 126 containing the complete packet. As noted above, in instances where more than one of queue buffers 26, 126 for a particular output contain a complete packet, arbiter 28, 128 may utilize a prioritization scheme to select which queue buffer 26, 126 is to receive the de-queue signal. Examples of prioritization schemes that may be utilized arbiter 28, 128 when selecting a queue buffer 26, 126 include, but are not limited to, first in time, round robin, fixed priority and random.

Figure 5:
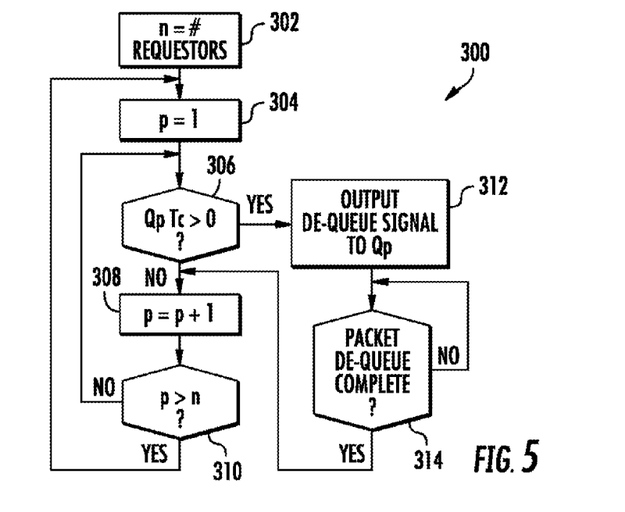
FIG. 5 is a flow diagram of an example implementation of the method of FIG. 4.

FIG. 5 is a flow diagram illustrating method 300, an example implementation of method 200. Method 300 is similar to method 200 except the method 300 is specifically disclose as utilizing a round robin prioritization scheme for selecting which buffer is to receive the de-queue signal when two or more queue buffers 26, 126 contain a complete packet. As indicated by block 302, a variable n is set to a value equal to the number of requesters, the number of inputs which are sending data to the output associated with the queue buffer arbitration system 20, 120. As indicated by block 304, a counter value p, is initially set to the value one, the value of the first of the series of queue buffers 26, 126. Counter p identifies which queue buffer 26, 126 is up next in the round robin prioritization scheme for "high priority" queue buffers (queue buffers containing a complete packet). As indicated by block 306, arbiter 28, 128 determines whether arbiter 28, 128 has received a tail signal from the particular queue buffer $Q_p$ indicating that the particular queue buffer $Q_p$, contains a complete packet. As indicated by block 308, if the particular queue buffer $Q_p$ does not, arbiter 28, 128 increments the counter value p to look at the next queue buffer 26, 126. As indicated by block 310, if arbiter 28, 128 has looked at each of the queue buffers (when p>n), arbiter 28, 128 begins a process a new by resetting the counter p back to one and step 304. As a result, arbiter 28, 128 reviews the buffer queues 26, 126 in a round-robin fashion and similarly outputs de-queue signals to the queue buffers in a round-robin sequential order of prioritization.

As indicated by step 312, if the particular buffer queue 26, 126 (corresponding to the buffer queue identified with counter p) as a tail count greater than zero indicating that at least one complete packet is contained within the particular queue buffer 26, 126, arbiter 28, 128 outputs a de-queue signal to the particular queue buffer 26, 126. As indicated by step 314, the queuing of the particular queue buffer 26, 126 continues until the complete packet has been de-queued or transferred to the associated output. Once the complete packet has been transferred, the counter p is recommended by one and step 308 and the process continues with arbiter 28, 128 proceeding to the next ordered queue buffer 26, 126.

Figure 6:
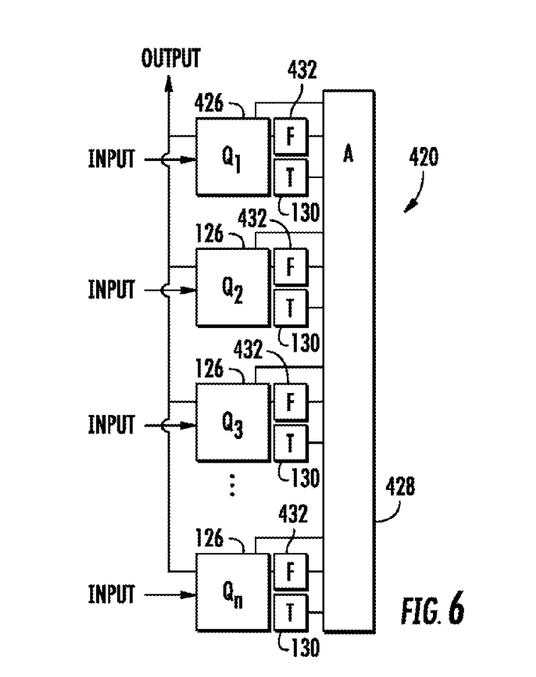
FIG. 6 is a schematic diagram of another example implementation of the queue buffer arbitration system of FIG. 1.

FIG. 6 schematically illustrates queue buffer arbitration system 420, another example implementation of queue buffer arbitration system 20. Queue buffer arbitration system 420 is similar to queue buffer arbitration system 120 except the queue buffer arbitration system 420 specifically utilizes a dual arbitration scheme, wherein "low priority" queue buffer contents (less than complete packets in a queue buffer) are de-queued when "high priority" queue buffer contents (complete packets in a queue buffer) are not present. In other words, de-queuing is initiated for queue buffers not having a complete packet, but having an incomplete packet, when no queue buffers contain a complete packet. Queue buffer arbitration system 420 is similar to queue buffer arbitration system 120 except that system 420 comprises queue buffers 426 and arbiter 428 in lieu of queue buffers 126 and arbiter 128, respectively. Queue buffers 426 are similar to queue buffers 126 except that the queue buffers 426 additionally comprise flit counters 432. Each flit counter 432 keeps track of or counts a number of flits (or other packet portion units) that have been received by the particular queue buffer 426. Each flit counter 432 outputs a flit (or other packet portion) signal to arbiter 428. In one implementation, the flit signal may indicate a number of packet portions are flits in the corresponding queue. In another implementation, the flit signal may be binary in nature, indicating the presence or absence of a flit or packet portion in the corresponding queue. In one implementation, flit counters 432 automatically assert or output the flit signal to arbiter 428 in a push fashion. In another implementation, flit counters 430 may be polled by arbiter 428 in a pull fashion.

Arbiter 428 is similar arbiter 128 described above except that arbiter 428 initiates the queuing of low priority queue buffers (those queue buffers that do not presently have a complete packet) in the absence of high priority queue buffers (queue buffers presently having a complete packet). As with arbiter 128, arbiter 428 arbitrates the order at which data held in queue buffers 426 is released to the associated output in a manner based upon tail signals received from tail counters 130. Arbiter 428 is configured to output a de-queue signal (DS) to one of the queue buffers 426 from which a tail signal has been received. By favoring those queue buffers 426 that contain a complete packet when determining for which queue buffer 426 de-queuing should be initiated, arbiter 428 is less likely to have to subsequently wait for the queue buffer 426 to receive the missing final packet portions of the packet being transmitted.

If none of the queue buffers 426 contain a complete packet, arbiter 428 is configured to determine if any of the queue buffers 426 contain at least a portion of a packet available for transmission to the output. Upon identifying a queue buffer 426 containing a portion of a packet (flit in the example illustrated), arbiter 428 outputs a de-queue signal to queue buffer containing or holding the portion of a packet. As a result, time or clock cycles are not wasted waiting for reception of a complete packet by any of the queue buffers 426. In instances where none of the queue buffers 426 presently contain a complete packet, but multiple queue buffers 426 contain a portion of a packet, arbiter 428 may utilize a prioritization scheme to select which queue buffer 426 is to receive the de-queue signal. Examples of prioritization schemes that may be utilized arbiter 428 when selecting a queue buffer 426 include, but are not limited to, first in time, round robin, fixed priority and random.

Figure 7:
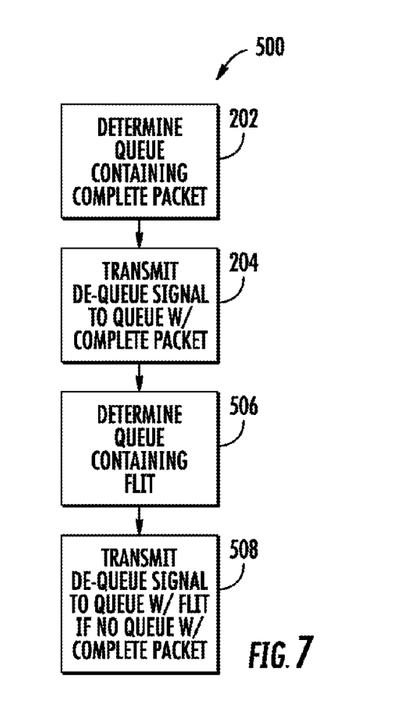
FIG. 7 is a flow diagram of an example method that may be carried out by the queue buffer arbitration system of FIG. 6.

FIG. 7 is a flow diagram of an example method 500 that may be implemented by queue buffer arbitration system 420. Method 500 is similar to method 200 except the method 500 additionally includes steps 506 and 508. Those remaining steps of method 500 which correspond to steps a method 200 are numbered similarly. As indicated by step 506, should arbiter 428 determine that none of the queue buffers 426 contain a complete packet (no tail signals have been received), arbiter 428 determines if any of the queue buffers 426 contain at least a portion of a packet (a flit) available for transmission to the output.

As indicated by step 508, upon identifying a queue buffer 426 containing a portion of a packet (flit in the example illustrated), arbiter 428 outputs a de-queue signal to queue buffer containing or holding the portion of a packet. In instances where none of the queue buffers 426 presently contain a complete packet, but multiple queue buffers 426 contain a portion of a packet, arbiter 428 may utilize a prioritization scheme to select which queue buffer 426 is to receive the de-queue signal. Examples of prioritization schemes that may be utilized arbiter 428 when selecting a queue buffer 426 include, but are not limited to, first in time, round robin, fixed priority and random.

Figure 8:
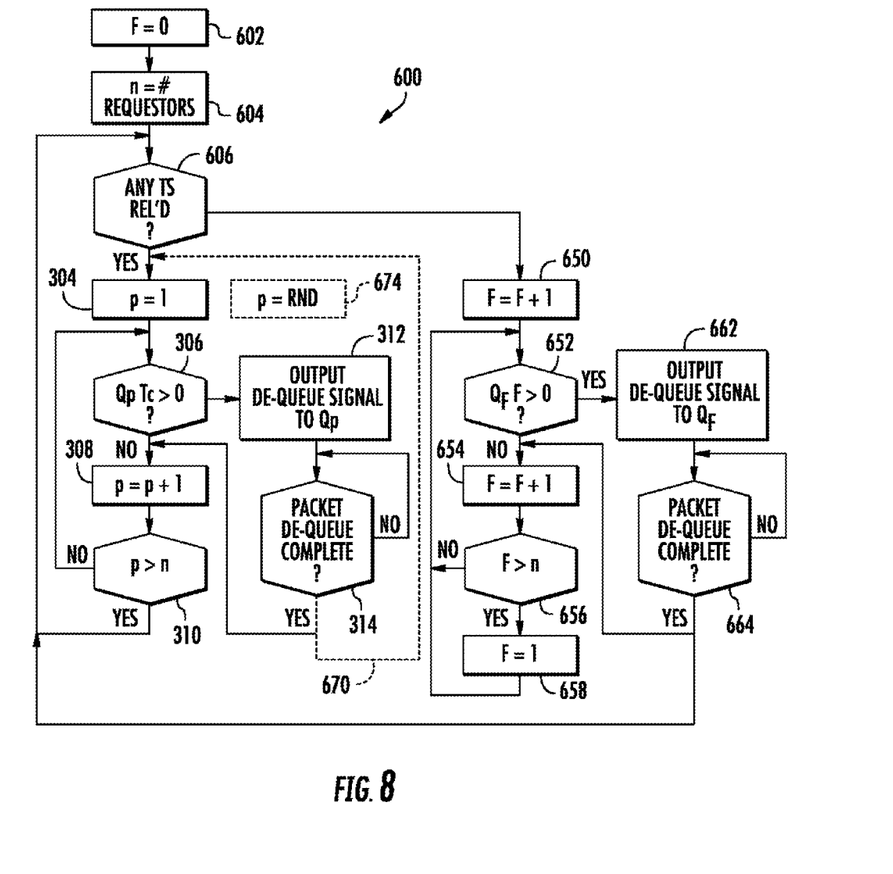
FIG. 8 is a flow diagram of an example implementation of the method of FIG. 7.

FIG. 8 is a flow diagram of method 600, an example implementation of method 500 that may be carried out by queue buffer arbitration system 420. Method 600 is similar to method 300 in that the method 600 is specifically disclosed as utilizing a round robin prioritization scheme for selecting which buffer is to receive the de-queue signal when two or more queue buffers 426 concurrently contain a complete packet. For ease of illustration, those blocks are steps of method 600 which correspond to blocks are steps of method 300 are numbered similarly.

As shown by FIG. 8, method 600 further utilizes a second round robin prioritization scheme for selecting which buffer is to receive the de-queue signal when none of the queue buffers 426 contain a complete packet, but when multiple queue buffers 426 concurrently contain a portion of a packet or flit ready for transfer to the output. As indicated by block 602, a counter F is initially set to zero. Counter F is used to identify which queue buffer 426 is up next in the round robin prioritization scheme for "low priority" queue buffers (queue buffers not containing a complete packet). As indicated by block 604, the variable n is set to a value equal to the number of queue buffers (requesters) which are requesting that data be sent to the output associated with the queue buffer arbitration system 420. As indicated by block 608, the counter p is set to 1, the value of the first of the series of queue buffers 426.

As indicated by block 606, arbiter 428 determines whether any of the requesters or queue buffers 426 contain a complete packet ready for transfer. As indicated by blocks 304-314, if arbiter 428 determines that at least one of queue buffers 426 contains a complete packet as indicated by the reception of at least one tail signal by arbiter 428, arbiter 428 proceeds through queue buffers 426 and a round robin fashion and transmits de-queue signals to those queue buffers 426 having a complete packet. In instances where more than one of queue buffers 426 for a particular output contain a complete packet, arbiter 128 selects which queue buffer 426 is to receive the de-queue signal using the same round-robin prioritization scheme.

If, however, arbiter 428 determines that none of the queue buffers 426 contain a complete packet ready for transfer to the output, arbiter 428 proceeds the flow diagram steps for carrying out "low priority" arbitration. As indicated by block 650, the counter F is incremented by one. As indicated by block 652, arbiter 428 determines whether arbiter 428 has received a flit signal from the particular queue buffer $Q_F$ indicating that the particular queue buffer $Q_F$ contains a complete packet. As indicated by block 654, if the particular queue buffer $Q_F$ does not, arbiter 428 increments the counter value p to look at the next queue buffer 428. As indicated by block 656, if arbiter 428 has looked at each of the queue buffers (when F>n), arbiter 428 begins a process a new by resetting the counter F back to one in step or block 658 and returning to step or block 652. As a result, arbiter 428 reviews the buffer queues 426 in a round-robin fashion and similarly outputs de-queue to the queue buffers 426 in a round-robin sequential order of prioritization.

As indicated by step 662, if the particular buffer queue 426 (corresponding to the buffer queue identified with counter F) has a flit count greater than zero indicating that at least one packet portion or flit is contained within the particular queue buffer 426, arbiter 428, outputs a de-queue signal to the particular queue buffer 426. As indicated by step 664, de-queuing of the particular queue buffer 426 continues until the complete packet has been de-queued or transferred to the associated output. Once the complete packet has been transferred, arbiter 428 returns to step 606, once again determining whether any tail signals TS have been received indicating that at least one of the queue buffers 426 presently contains a complete packet.

In the example illustrated in FIG. 8, if more than one high priority queue buffer exists, arbiter 428 automatically proceeds to the next high priority queue buffer in the round-robin order after the complete packet of the prior queue buffer has been transferred to the output. If no high priority queue buffers exist after a complete packet has been transferred from a low priority queue buffer (per block 664), arbiter 428 automatically proceeds to the next low priority queue buffer in the round-robin order. If more than one high priority queue buffer exists after a complete packet has been transferred from a low priority queue buffer (per block 664), arbiter 428 automatically resets to the first queue buffer in the round-robin series of high priority queue buffers (per step 304). In contrast, arbiter 428 does not automatically reset to the first queue buffer in the round-robin series of low priority queue buffers when arbiter 428 determines that no high priority queue buffers exist. As a result, low priority queue buffers at the end of the series are more likely to be de-queued.

In other implementations, arbiter 428 may prioritize between high priority queue buffers and low priority queue buffers in alternative fashions. For example, instead of utilizing a round robin prioritization scheme for both high priority and low priority queue buffers, arbiter 428 may employ a first priority schemes for high priority queue buffers and a second different priority scheme for low priority queue buffers. As indicated by broken line 670, in one implementation, arbiter 428 may employ a fixed prioritization scheme, wherein the queue buffers 426 are ranked in order of priority or importance with the highest priority queue buffer having a counter value for p equal to 1. As shown by line 670, instead of returning to step 308 after a complete packet has been transferred from a high priority queue (per step 314), arbiter 428 may alternatively return to step 304, wherein arbiter 428 returns to the highest priority queue buffers when determining which of the high priority queue buffers to de-queue first.

In other implementations, arbiter 428 may prioritize amongst high priority queue buffers using a somewhat random prioritization scheme. For example, in one implementation, arbiter 428 may employ a hybrid of a round-robin prioritization scheme. In one implementation, block or step 304 may alternatively be replaced with block or step 674 (shown in broken lines). In such an implementation, the beginning of the sequential prioritization of the series of queue buffers is randomly chosen by arbiter 428. In yet other implementations, arbiter 428 may select which of the high priority queue buffers is to receive the de-queue signal based upon when arbiter 428 received the tail count signal from the particular type priority queue buffer. For example, the prioritization of multiple high priority queue buffers may be based on the order in which tail count signals received from the queue buffers. Similar prioritization schemes may be utilized by arbiter 428 when arbitrating between low priority queue buffers.

Figure 9:
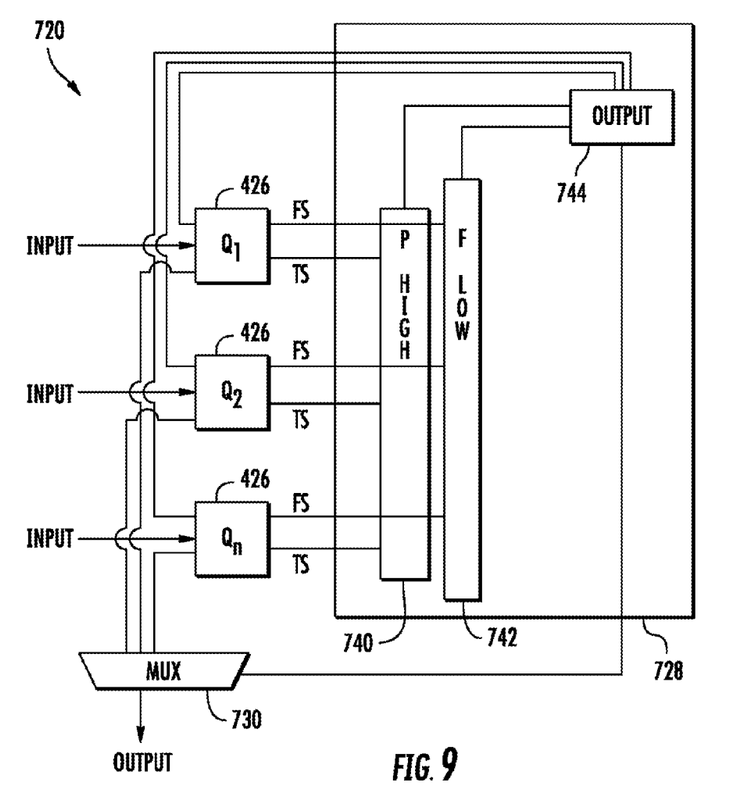
FIG. 9 is a schematic circuit diagram of an example implementation of the queue buffer arbitration system of FIG. 6.

FIG. 9 is a schematic circuit diagram of queue buffer arbitration system 720, an example implementation of queue buffer arbitration system 420. Queue buffer arbitration system 720 comprises multiplexor (MUX) 722, queue buffers 426 and arbiter 728. Multiplexor 722 comprises an electronic device that signals and forwards data from one of queue buffers 426 to the output in response to signals received from arbiter 728.

Queue buffers 426 are described above with respect to system 420. Each queue buffer 426 transmits a tail count signal (TS) to arbiter 728 when the queue buffer 426 contains a complete packet and transmits a flit count signal (FS) to arbiter 728 when the queue buffer contains at least one portion of a packet or flit.

Arbiter 728 comprises a circuit comprising high priority selector circuit 740, low priority selector circuit 742 and de-queue output 744. High priority selector circuit 740 receives tail count signals from buffer queues 426 to identify high-priority buffer queues, to arbitrate between high priority buffer queues 426 (those buffer queues that contain a complete packet) and to transmit a single to de-queue output 744 indicating which of the high party buffer queues should receive a de-queue signal. Similarly, low priority selector circuit 742 receives flit count signals from buffer queues 426 to identify low priority buffer queues, to arbitrate between low priority buffer queues 426 (those buffer queues that contain a portion of a packet) and to transmit a single to de-queue output 744 indicating which of the low party buffer queues should receive a de-queue signal. Output 744 receive signals from selector circuit 740, 742 and gives priority to the signal received from high priority selector circuit 740. In other words, output 744 outputs a de-queue signal to the queue buffer identified by the signal from selector circuit 740 over any output queue identified by the low priority selector circuit 742. If no signal is received from high priority selector circuit 740 or if the signal indicates that there are no high priority buffer queues, output 744 then outputs a de-queue signal to the queue buffer identified by the signal from selector circuit 742. In one implementation, the de-queue signal is transmitted by output 744 to the chosen queue buffer 426 and to multiplexor 730 to effectuate the transfer of the data to the output.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   queue buffers, each queue buffer to concurrently receive and contain portions of different packets, each queue buffer to receive and contain portions of packets and to output a tail signal indicating when the portions amount to a complete packet entirely contained in the queue buffer;
   an arbiter to receive the tail signal and, in response to receiving the tail signal, to output a de-queue signal to one of the queue buffers from which the tail signal was received to initiate dequeuing of the complete packet entirely contained within said one of the queue buffers; and
   wherein the arbiter, in response to receiving multiple instances of the tail signal from different queue buffers of a plurality of the queue buffers prior to outputting a dequeue signal in response any of the multiple instances of the tail signal, indicating that the different queue buffers each concurrently contain a complete packet, is to output the dequeue signal to one of: a next in order queue buffer of the plurality of buffers in a round robin of the plurality of queue buffers, a queue buffer of the plurality of queue buffers having a highest ranked fixed priority, or a queue buffer randomly selected from the plurality of queue buffers.

2. The apparatus of claim 1, wherein each queue buffer is to output a packet portion signal indicating a packet portion in the queue buffer, wherein the arbiter is to transmit a de-queue signal to one of the queue buffers from which a packet portion signal was received should none of the queue buffers contain a complete packet.

3. The apparatus of claim 1, wherein each queue buffer comprises a tail counter counting the number of complete packets in the queue buffer.

4. The apparatus of claim 1, wherein the arbiter comprises a circuit of a fabric switch.

5. The apparatus of claim 1, wherein the arbiter, in response to receiving multiple instances of the tail signal from different queue buffers of the plurality of the queue buffers prior to outputting the dequeue signal in response any of the multiple instances of the tail signal, indicating that the different queue buffers each concurrently contain a complete packet, is to output the dequeue signal to the next in order queue buffer of the plurality of buffers in the round robin of the plurality of queue buffers.

6. The apparatus of claim 1, wherein the arbiter, in response to receiving multiple instances of the tail signal from different queue buffers of the plurality of the queue buffers prior to outputting the dequeue signal in response any of the multiple instances of the tail signal, indicating that the different queue buffers each concurrently contain a complete packet, is to output the dequeue signal to the queue buffer of the plurality of queue buffers having the highest ranked fixed priority.

7. The apparatus of claim 1, wherein the arbiter, in response to receiving multiple instances of the tail signal from different queue buffers of the plurality of the queue buffers prior to outputting the dequeue signal in response any of the multiple instances of the tail signal, indicating that the different queue buffers each concurrently contain a complete packet, is to output the dequeue signal to the queue buffer randomly selected from the plurality of queue buffers.

8. The apparatus of claim 1, wherein each portion of a packet comprises a flit.

9. A method, comprising:
   a queue buffer outputting a tail signal indicating a complete packet entirely contained within the queue buffer;
   an arbiter receiving the tail signal;
   the arbiter outputting a de-queue signal to the queue buffer from which the tail signal was received; and
   initiating dequeuing of the complete packet from the queue buffer, from which the tail signal was received by the arbiter, in response to receiving the dequeue signal;
   wherein the arbiter, in response to receiving multiple instances of the tail signal from different queue buffers of a plurality of the queue buffers prior to outputting a dequeue signal in response to any of the multiple instances of the tail signal, indicating that the different queue buffers each concurrently contain a complete packet, outputs the dequeue signal to at least one of: a queue buffer of the plurality of queue buffers having a highest ranked fixed priority, a next in order queue buffer in a round robin ordering of a plurality of queue buffers, or a queue buffer randomly selected from the plurality of queue buffers.

10. The method of claim 9, further comprising:
    each of a plurality of queue buffers outputting a packet portion signal indicating a packet portion in the queue buffers; and
    the arbiter transmitting a de-queue signal to one of the queue buffers from which a packet portion signal was received if none of the queue buffers contain a complete packet.

11. The method of claim 9, wherein each queue buffer comprises a tail counter counting the number of complete packets in the queue buffer.

12. The method of claim 9, wherein the arbiter comprises a circuit of a fabric switch.

13. The method of claim 9, wherein the arbiter, in response to receiving multiple instances of the tail signal from different queue buffers of the plurality of the queue buffers prior to outputting the dequeue signal in response any of the multiple instances of the tail signal, indicating that the different queue buffers each concurrently contain a complete packet, outputs the dequeue signal to the next in order queue buffer in a round robin ordering of the plurality of queue buffers.

14. The method of claim 9, wherein the arbiter, in response to receiving multiple instances of the tail signal from different queue buffers of a plurality of the queue buffers prior to outputting a dequeue signal in response to any of the multiple instances of the tail signal, indicating that the different queue buffers each concurrently contain a complete packet, outputs the dequeue signal to a queue buffer of the plurality of queue buffers having a highest ranked fixed priority.

15. The method of claim 9, wherein the arbiter, in response to receiving multiple instances of the tail signal from different queue buffers of a plurality of the queue buffers prior to outputting a dequeue signal in response to any of the multiple instances of the tail signal, indicating that the different queue buffers each concurrently contain a complete packet, outputs the dequeue signal to the queue buffer of the plurality of queue buffers that is randomly selected from the plurality of queue buffers.

16. The method of claim 9, wherein the dequeue signal initiates dequeuing of the complete packet from which the tail signal was received and wherein arbiter outputs the dequeue signal in response to receiving the tail signal.

* * * * *